May 12, 1925. 1,537,526

L. DUFEK

HEADLIGHT LENS

Filed July 16, 1923

Inventor
Louis Dufek
By J. L. Rivers
Attorney.

Patented May 12, 1925.

1,537,526

UNITED STATES PATENT OFFICE.

LOUIS DUFEK, OF SEATTLE, WASHINGTON.

HEADLIGHT LENS.

Application filed July 16, 1923. Serial No. 651,696.

*To all whom it may concern:*

Be it known that I, LOUIS DUFEK, a citizen of the Czechoslovak Republic, residing at Seattle, in the county of King and State of Washington, have invented a new and useful Headlight Lens, of which the following is a specification.

My invention, relating as it does to improvements in headlight lenses particularly suitable for use with motor vehicles, has for its objects the provision of a lens of the non-glare variety so constructed as to direct adequate light to the roadway, to subdue and diffuse upwardly ascending rays of light, and to present a non-glare face to observers.

In the accompanying drawing—

Figure 1:
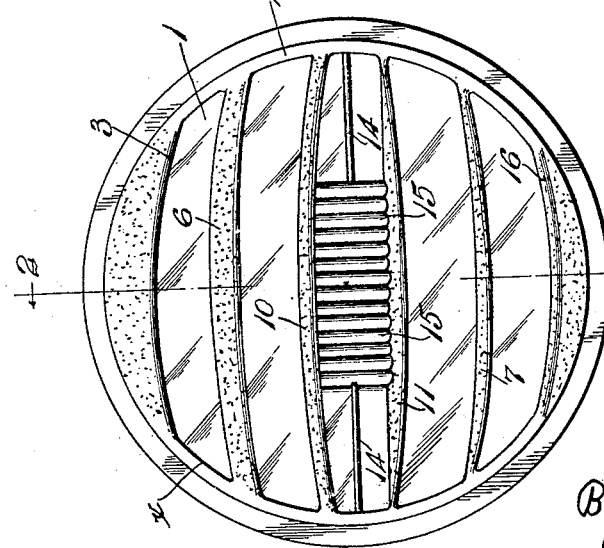

Figure 1 is a front elevation of the lens.

Figure 2:
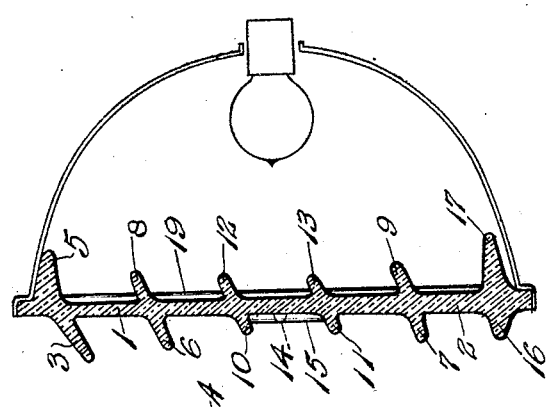

Fig. 2, a vertical sectional view of the same drawn on the line 2—2, Fig. 1; a diagrammatic view of a headlight being included to illustrate the lens as mounted therein.

Figure 3:
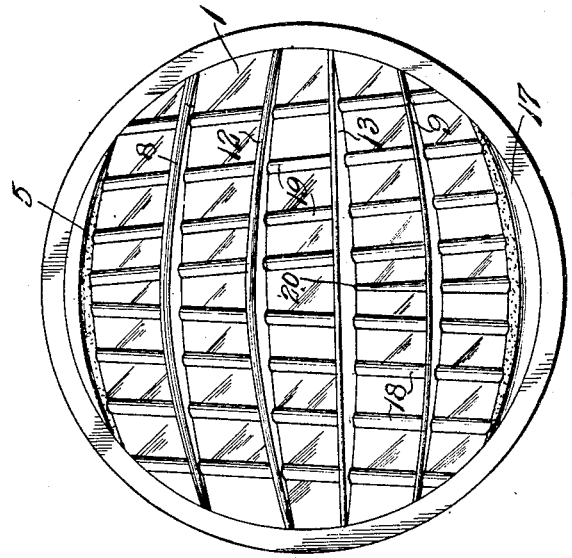

Fig. 3, a rear elevation of said lens.

In the drawing, 1 denotes a body of uncolored glass, preferably slightly thicker at its lower portion 2, to give it light refracting properties. 3 designates a transversely extending and slightly curved ridge on the upper portion of the face which merges into the rim, and also merges into an upstanding ridge 4, on either side. Said ridges 4 are of clear glass, prismatic in form and also connect with and enclose the other ridges disposed on the face, and which will be hereinafter described. The rear section of the lens carries a projection 5, the upper portion of which is adapted to conform to the upper inner periphery of the headlight, and its lower portion providing, in connection with the ridge 3, light deflecting and diffusing surfaces.

In the preferred embodiment of the invention the lower surfaces of the projection 5 and the ridge 3 are frosted, and the upper surface of the ridge 3 is likewise frosted up to the point where it merges into the rim, for the purposes of deflecting downwardly extending rays of light and diffusing and subduing rays of light extending upwardly. Said surfaces may be colored, if desired, by fusing color into the glass, by painting, or in any other suitable manner, and still be within the spirit of my invention. When a color is thus used I prefer green, as it is a color restful to the eyes and indicative of a front light.

6 and 7 denote a pair of downwardly extending ridges on the face, which, to afford symmetrical proportions, are slightly and reversely curved. The inwardly extending ridges 8 and 9 projecting from the rear of the body comprise, in conjunction with the adjacent and respective ridges 6 and 7, downwardly inclined light deflecting surfaces, the upper portions of both the inner and outer ridges being frosted.

Disposed between said ridges the face of the lens carries another pair of downwardly extending ridges 10 and 11, slightly and reversely curved, and in connection therewith on the inner portion a pair of inclined ridges 12 and 13, which also define in conjunction with the ridges 10 and 11, downwardly inclined light deflecting surfaces, the upper portions of which are frosted.

The medial portion of the face carries a pair of horizontal ribs 14 of clear glass, and disposed therebetween a plurality of vertically extending fine ribs 15, also of clear glass. Said first-named ribs are for the purpose of refracting light rays downwardly at these points, and the last-named ribs subserve the purpose of refracting light rays laterally. To facilitate these objects the ridges 10 and 11, and their respective inner adjacent ridges 12 and 13 are preferably shorter in width than the other transverse ridges with which the lens is provided.

The lower projections 16 and 17 on the face and rear of the lens are designed to be frosted or colored on their upper surfaces, as heretofore described with reference to the upper ridges 3 and 5, and the lower curved surface of the projection 16 to be frosted to the point where it merges into the rim, thus affording surfaces adapted to deflect light rays outwardly of the lens and cooperating with the adjacent ridges in producing a subdued diffusion of light in the lower part of the lens.

In aid of symmetry, the transverse ridges heretofore described gradually decrease in width toward the rim on either side; those on the face being enclosed at their ends by the upstanding curved ridges 4. The ridges 4 also serve to refract light rays laterally of the headlight. Ridges, however, may be provided of a different contour and still be effective for the purposes for which they are intended, as for instance, ridges extending horizontally and of an even width, or reduced in width adjacent their end portions. I contemplate also, that if deemed desirable or expedient, the application of color may be made to ridges of the lens other than those I have specifically enumerated, and in a similar manner.

As indicated in Fig. 3, the rear of the lens is provided with a plurality of vertically extending ribs of clear glass disposed between the transverse ridges, one series of which designated 18 is angularly disposed toward a side of the lens, and the other series 19 is likewise disposed toward the opposite side, and a vertically extending rib 20 interposed between said series and at the lower portion of the lens. Said ribs located in angular relation with the back of the body are refractive in character, and are for the purpose of refracting light rays laterally of the lens, and to either side.

A distinctive feature of this lens resides in the fact that the light-deflecting ridges are carried on both the face and rear of the body, and thus are able to perform their respective functions with projections on the face which are narrower than would be required if equal projecting surfaces were confined to the face, making a lens which is more pleasing in appearance, and reducing the hazard of breakage. The ridges, inclined as they are, cooperating with the clear glass of the body between them, serve to deflect light rays to the roadway, and being provided with frosted or colored surfaces, or both, as heretofore described, they subdue the upwardly extending rays of light, and present a face to the observer in which the glare, commonly incident to the average headlight is eliminated.

The central section of the face, while of clear glass, is provided with ribs extending vertically which also tend to subdue the glare, and are made more effective in this respect by the frosted transverse ridges immediately above and below them. They also, coacting with the vertically extending ribs on the back of the body, serve to direct rays of light laterally, thereby diffusing the light over a larger area, and making less intense the rays which emanate directly in front of the lens.

I claim:

1. A headlight lens, comprising a body having a transversely and downwardly extending ridge on its upper face portion and an inwardly extending ridge on its back portion complementary to the first ridge, said ridges defining downwardly extending light deflecting surfaces, the upper surface of the first ridge to where it merges into the rim and the lower surface of the second ridge being of a color adapted to dim and diffuse upwardly extending rays of light, a plurality of transversely extending spaced ridges on the face located below the first ridge, complementary inwardly extending ridges on the back of the body to define, in connection with said plurality of ridges, downwardly extending light deflecting surfaces, the upper surfaces of which are translucent, an upstanding, curved, light refracting ridge on either side of the face of the body and connecting the ends of said transversely extending ridges, a plurality of vertical light refracting ribs disposed in the medial portion of the face and between a pair of the transversely extending ridges, a series of vertically extending light refracting ribs located between the ridges on the back of the body and angularly disposed toward a side of the body, and a second series of vertically extending light refracting ribs located between the ridges on the back of the body and angularly disposed toward the other side of the body.

2. In a headlight lens having a plurality of light deflecting ridges in spaced parallel relation on its inner surface, a series of vertically extending light refracting ribs located between the ridges and angularly disposed toward a side of the body, and a second series of vertically extending light refracting ribs located between the ridges and angularly disposed toward the other side of the body.

LOUIS DUFEK.